(12) United States Patent
Straeter

(10) Patent No.: US 11,817,814 B2
(45) Date of Patent: Nov. 14, 2023

(54) GROUND MOUNTED SOLAR POWER ASSEMBLY

(71) Applicant: James E. Straeter, Rochester, IN (US)

(72) Inventor: James E. Straeter, Rochester, IN (US)

( * ) Notice: Subject to any disclaimer, the term of this patent is extended or adjusted under 35 U.S.C. 154(b) by 0 days.

(21) Appl. No.: 17/732,110

(22) Filed: Apr. 28, 2022

(65) Prior Publication Data

US 2022/0352846 A1 Nov. 3, 2022

Related U.S. Application Data

(60) Provisional application No. 63/180,799, filed on Apr. 28, 2021.

(51) Int. Cl.
*H02S 20/30* (2014.01)

(52) U.S. Cl.
CPC .................... *H02S 20/30* (2014.12)

(58) Field of Classification Search
CPC .......... H02S 20/00; H02S 20/20; H02S 20/21; H02S 20/22; H02S 20/23; H02S 20/24; H02S 20/25; H02S 20/26; H02S 20/30; H02S 20/32; H02S 30/00; H02S 30/10; H02S 30/20; F24S 25/63; F24S 25/632; F24S 25/634; F24S 25/636; F24S 25/65; F24S 25/67; F24S 30/425
USPC ....................................................... 211/41.1
See application file for complete search history.

(56) References Cited

U.S. PATENT DOCUMENTS

| 4,239,555 | A  | * | 12/1980 | Scharlack | ......... | B32B 17/10302 |
| | | | | | | 156/286 |
| 8,671,930 | B2 | * | 3/2014 | Liao | ....................... | F24S 25/12 |
| | | | | | | 126/576 |
| 8,939,648 | B2 | * | 1/2015 | Schneider | ............... | F24S 25/70 |
| | | | | | | 384/444 |
| 9,551,508 | B2 | * | 1/2017 | Straeter | .................... | F24S 25/70 |
| 9,640,695 | B2 | * | 5/2017 | Fischer | ................. | F24S 30/425 |
| 10,536,109 | B2 | * | 1/2020 | Corio | ..................... | F16M 11/18 |
| 10,917,041 | B2 | * | 2/2021 | Wang | ..................... | F24S 80/70 |
| 10,931,224 | B2 | * | 2/2021 | Praca | ..................... | F16H 1/32 |
| 11,466,458 | B2 | * | 10/2022 | Jones | ..................... | H02S 30/20 |
| 2008/0011921 | A1 | * | 1/2008 | Aramaki | ................. | F24S 25/33 |
| | | | | | | 248/237 |
| 2010/0065039 | A1 | * | 3/2010 | Chang | ................... | F24S 30/425 |
| | | | | | | 126/573 |
| 2011/0240006 | A1 | * | 10/2011 | Linke | ..................... | H02S 20/32 |
| | | | | | | 126/600 |
| 2012/0031862 | A1 | * | 2/2012 | Belikoff | .................. | F24S 25/33 |
| | | | | | | 211/41.17 |

(Continued)

FOREIGN PATENT DOCUMENTS

| CN | 201820766 | U | * | 5/2011 | ............. | F24S 25/12 |
| DE | 10054349 | A1 | * | 5/2002 | ............. | F24J 2/5207 |

(Continued)

*Primary Examiner* — Joshua E Rodden
(74) *Attorney, Agent, or Firm* — ZarleyConley PLC

(57) ABSTRACT

A solar panel assembly having at least one solar panel array pivotally connected to a plurality of legs using a support beam. Cross members are connected to the support beam and extend transversely in relation to the support beam. The cross members are also positioned in parallel spaced relation along a length of the support beam. A plurality of rail members having a top wall with a plurality of slots that extend along a length of the top wall in a first and a second row are connected to the cross members.

16 Claims, 2 Drawing Sheets

(56) References Cited

U.S. PATENT DOCUMENTS

| | | | | | |
|---|---|---|---|---|---|
| 2013/0008103 | A1* | 1/2013 | Sagayama | ............... | H02S 20/10 |
| | | | | | 211/183 |
| 2013/0153007 | A1* | 6/2013 | Plesniak | ................ | H02S 20/30 |
| | | | | | 136/251 |
| 2013/0153519 | A1* | 6/2013 | Ashmore | ................ | F24S 25/12 |
| | | | | | 211/1.54 |
| 2014/0117190 | A1* | 5/2014 | Werner | ..................... | E04C 3/08 |
| | | | | | 248/346.03 |
| 2014/0261639 | A1* | 9/2014 | Kim | ........................ | H02S 30/00 |
| | | | | | 136/251 |
| 2014/0305887 | A1* | 10/2014 | Zuritis | .................... | H02S 30/10 |
| | | | | | 29/897.3 |
| 2015/0316639 | A1* | 11/2015 | Russ | ....................... | H02S 20/00 |
| | | | | | 250/203.4 |
| 2018/0131320 | A1* | 5/2018 | Hood | ..................... | H02S 20/32 |
| 2020/0115906 | A1* | 4/2020 | Jones | ................. | E04D 13/0645 |
| 2022/0200521 | A1* | 6/2022 | Kauffman | ............... | H02S 30/10 |
| 2022/0200522 | A1* | 6/2022 | de Fresart | .............. | H02S 20/30 |
| 2022/0294386 | A1* | 9/2022 | Creasy | ................... | H02S 20/32 |

FOREIGN PATENT DOCUMENTS

| | | | | | |
|---|---|---|---|---|---|
| DE | 202009000030 | U1 * | 5/2009 | ............. | F24J 2/5203 |
| JP | 09235844 | A * | 9/1997 | ............... | F24S 25/20 |
| WO | WO-2014072505 | A1 * | 5/2014 | ............. | F24J 2/5207 |

* cited by examiner

GROUND MOUNTED SOLAR POWER ASSEMBLY

CROSS REFERENCE TO RELATED APPLICATION

This application claims the benefit of U.S. Provisional Application Ser. No. 63/180,799 filed Apr. 28, 2021, the content of which is hereby incorporated by reference in its entirety.

BACKGROUND OF THE INVENTION

This invention is directed to a solar mounting assembly and more particularly to an improved manner of attaching solar panels to a support system and an improvement in design of the central pivot member to reduce the number of parts needed and to reduce shipping and handling costs.

Solar power assemblies are known in the art. Solar panels are mounted on rooftops and on ground mount stands. Rooftop mounting is done when space is limited and when system sizes are small while ground mounted systems are used when space is available and systems are large. This invention provides for cost reductions in a pivotable ground mount system as disclosed in U.S. Pat. No. 9,551,508 which provides for higher energy yields due to adjustment of panels to the sun during seasonal changes of the sun's location in the sky.

With one example the pivot point member is a pipe that must be sizeable to withstand wind forces. Typically this pipe is a single pipe that must be 40+ feet long to achieve efficient array size. This invention provides for segmented pipe assemblies achieving total lengths needed without the costs involved with handling long, heavy pipes.

Segments of pipes are bolted together at the install site. Shipment lengths of these pipes can be in the 10' range and can be stacked on a pallet, thereby enabling standard shipping and handling methods. Costs are reduced considerably. Additionally, each pipe segment enables each rail assembly to be the same part number as dimensions are consistent. Therefore, to achieve these cost savings a new assembly is needed to address current issues and costs.

By bolting these segments together an array can be built that is segmented with one leg per segment, one 'wing' bolted to a plate in the center of the section and a wing on each end that is shared with adjacent sections. Rails that mount to wings are always of equal length and therefore only one part number of rail will be needed except for the outer rail which extends past the end wing. Because solar panels come in many different widths and lengths, the slotted hat rail, which is part of this assembly, allows for mounting by clamping down on the frame of a panel rather than using a direct bolt design which would require different hole spacings for each size of panel.

Keeping the energy yield benefits of a tiltable stand while making the stand universal provides significant cost savings from reduced part numbers and reduced shipping and handling costs as well as improving on-site assembly time in handling smaller parts and less complexity of parts used.

An objective of the present invention is to provide a solar panel assembly that reduces the number of parts needed to reduce costs and shipping expense.

Another objective of the present invention is to provide segmented pipe assemblies to achieve desired lengths without the cost of handling long and heavy pipes.

These and other objectives will be apparent to those having skill in the art based upon the following written description, drawings and claims.

SUMMARY OF THE INVENTION

A solar panel assembly has at least one solar panel array pivotally connected to a plurality of legs using a support beam. Cross members are connected to the support beam and extend transversely in relation to the support beam. The cross members are positioned in parallel space relation along a length of the support member. Connected to the cross members are a plurality of rail members.

The rail members have a top wall having a plurality of slots that extend along the length of the top wall in a first and a second row. The top wall terminates into a pair of side walls that extend perpendicularly in relation to the top wall. The side walls terminate into a pair of feet that extend outwardly away from the top wall and are perpendicular in relation to the side walls.

The slots have a first end and a second end and are positioned so that the slots in the first row overlap the slots in the second row. Also, each end of the plurality of rail members has a half slot positioned so that when adjacent rail members butt up against one another a full slot is formed. Each end of the plurality of rail members has a pair of holes that receive bolts to secure the plurality of rail members to the cross members.

Each solar panel is mounted to a frame having a first member that extends outwardly from an outer edge of the solar panel and terminates in an outer edge member that is perpendicular in relation to the first member and extends downwardly from the first member. The outer edge member terminates in a second member that is perpendicular in relation to the outer edge member and extends inwardly to a position below and parallel to the first member. A lockdown plate having a hole is positioned on top of the second member and the hole is aligned with a slot of one of the plurality of rail members such that a bolt is received through the hole and the slot and secured with a nut and washer to provide a clamping force to the second member.

DETAILED DESCRIPTION

Figure 1:
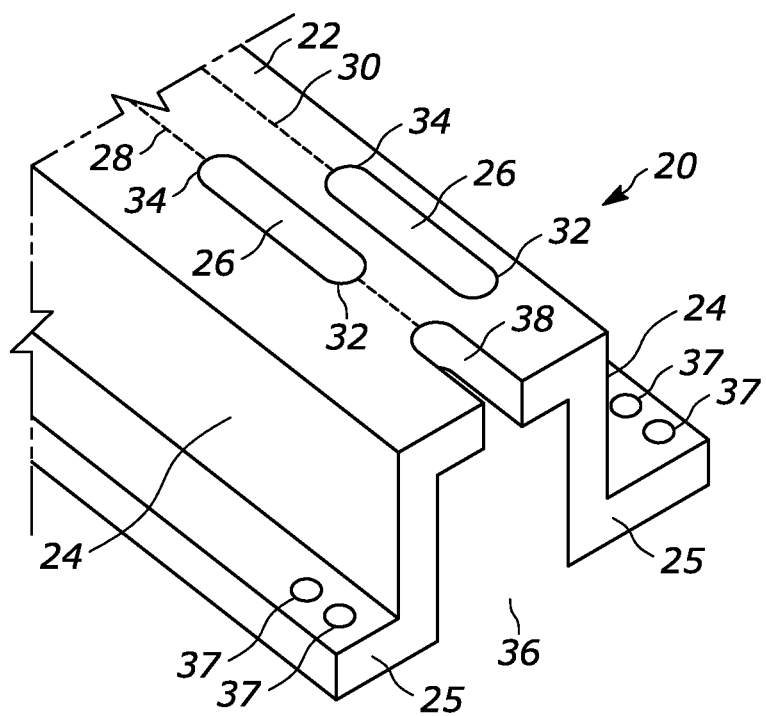
FIG. 1 is a perspective view of a rail member for a solar panel assembly.
Figure 2:
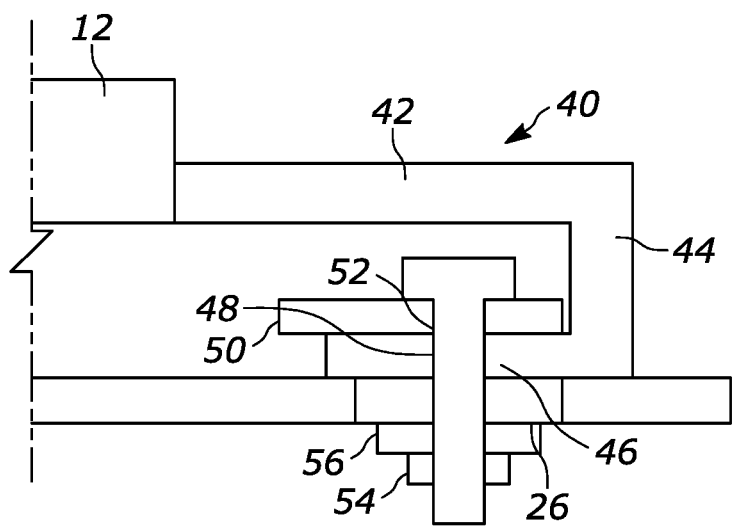
FIG. 2 is a side sectional view of a solar panel assembly.
Figure 3:
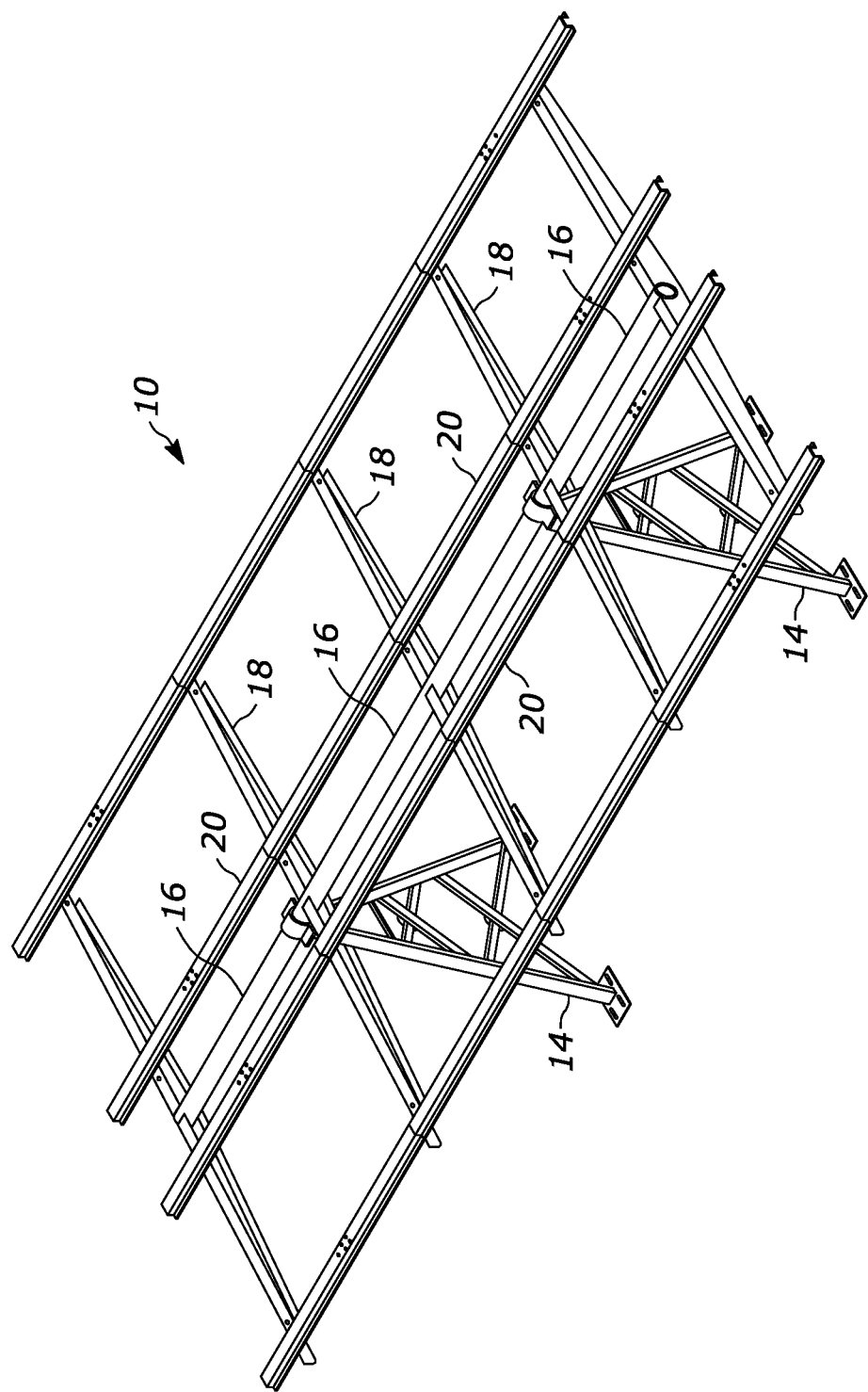
FIG. 3 is a perspective view of a solar panel assembly.

Referring to the Figures, the solar panel assembly 10 has one or more solar panel arrays 12 that are pivotally connected to a plurality of legs 14. The pivotal connection is of any type and in one example a pivotal connection as disclosed in U.S. Pat. No. 9,551,508 incorporated herein by reference in its entirety is used including a support beam 16 that is rotatably connected to a plurality of legs 14 by a clamping mechanism (not shown).

Connected to and extending transversely in relation to the support beam 16 are cross members 18. The cross members 18 are positioned in parallel spaced relation along the length of the support beam 16. Connected to and extending between the cross members 18 are a plurality of spaced rail members 20. In a preferred example the rail members 20 are elongated with a top wall 22 that terminates into a pair of side walls 24 that extend perpendicularly in relation to the top wall 22. The side walls 24 terminate into a pair of feet or flanges 25 that extend outwardly away from the top wall 22 and are genuinely perpendicular in relation to the side walls 24.

The top wall 22 has a plurality of slots 26 that extend along the length of the top wall 22 in a first 28 and a second 30 row that are in spaced parallel relation. The slots 26 have a first end 32 and a second end 34 and are positioned so that the slots 26 in the first row 28 overlap the slots in the second row 30. In other words, the first end 32 of a slot 26 in the first row 28 extends beyond the second end 34 of a slot 26 in the second row 30. Also, at each end 36 of the rail member 20 there is a half slot 38 that when the ends 36 of two adjacent rail members 20 butt up against one another a full slot 26 is formed. The ends 36 have a pair of holes 37 that receive bolts 39 to secure the rail members 20 to the cross members 18.

Each solar panel 12 is mounted to a frame 40. The frame 40 has a first member 42 that extends outwardly from an outer edge 44 of the solar panel and terminates in an outer edge member 44 that is perpendicular in relation to the first member 42 and extends downwardly from the first member 42. The outer edge member 44 terminates in a second member 46 that is perpendicular in relation to the outer edge member 44 and extends inwardly to a position below and parallel to the first member 42.

To secure the solar panel 12 to the rail member 20 a lockdown plate 50 having a hole 52 is placed on top of the second member 46 and a hole 52 is aligned with a slot 26. A bolt 39 is inserted through a hole 52, and a slot 26 and secured with a nut 54 and washer 56. When tightened the lockdown plate 50 assists in maintaining the bolt 39 in position while also adding a clamping force to the second member 46 of frame 40. Through testing, the use of the bolt 39 and lockdown plate 50 to connect the frame 40 to the rail member 20 has held when subjected to three times the force of a 90-mph wind. Preferably four bolts 39 and lockdown plates 50 are used per solar panel 12. Using the lockdown plate and slot allows for different sizes of panels to be used on arrays with fixed-spaced rails.

From the above discussion and accompanying figures and claims it will be appreciated that the solar panel assembly 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A solar panel assembly, comprising:
   at least one solar panel array pivotally connected to a plurality of legs using a support beam;
   cross members connected to and extending transversely in relation to the support beam, wherein the cross members are positioned in parallel spaced relation along a length of the support beam; and
   a plurality of rail members connected to the cross members wherein the plurality of rail members have a top wall with a plurality of slots that extend along a length of the top wall in a first and a second row wherein each end of the plurality of rail members has a half slot positioned so that when adjacent rail members butt up against one another a full slot is formed.

2. The assembly of claim 1 wherein the top wall of the plurality of rail members terminates into a pair of side walls that extend perpendicularly in relation to the top wall.

3. The assembly of claim 2 wherein the side walls terminate into a pair of feet that extend outwardly away from the top wall and are perpendicular in relation to the side walls.

4. The assembly of claim 1 wherein the slots have a first end and a second end and are positioned so that the slots in the first row overlap the slots in the second row.

5. The assembly of claim 1 wherein each end of the plurality of rail members have a pair of holes that receive bolts to secure the plurality of rail members to cross members.

6. The assembly of claim 1 wherein a solar panel of the at least one solar array is mounted to a frame having a first member that extends outwardly from an outer edge of the solar panel of the at least one solar panel array and terminates in an outer edge member that is perpendicular in relation to the first member and extends downwardly from the first member.

7. The assembly of claim 6 wherein the outer edge member terminates in a second member that is perpendicular in relation to the outer edge member and extends inwardly to a position below and parallel to the first member.

8. The assembly of claim 7 wherein a lockdown plate having a hole is positioned on top of the second member and the hole is aligned with a slot in one of the plurality of rail members such that a bolt is received through the hole and the slot and secured with a nut and washer to provide a clamping force to the second member.

9. A solar panel assembly, comprising:
   at least one solar panel array pivotally connected to a plurality of legs using a support beam;
   cross members connected to and extending transversely in relation to the support beam, wherein the cross members are positioned in parallel spaced relation along a length of the support beam; and
   a plurality of rail members connected to the cross members wherein the plurality of rail members have a top wall with a plurality of slots that extend along a length of the top wall in a first and a second row, the plurality of slots having a first end and a second end wherein the slots are positioned such that the first end of a slot in the first row extends beyond the second end of a slot in the second row.

10. The assembly of claim 9 wherein the top wall of the plurality of rail members terminates into a pair of side walls that extend perpendicularly in relation to the top wall.

11. The assembly of claim 10 wherein the side walls terminate into a pair of feet that extend outwardly away from the top wall and are perpendicular in relation to the side walls.

12. The assembly of claim 9 wherein each end of the plurality of rail members has a half slot positioned so that when adjacent rail members butt up against one another a full slot is formed.

13. The assembly of claim 12 wherein each end of the plurality of rail members have a pair of holes that receive bolts to secure the plurality of rail members to cross members.

14. The assembly of claim 9 wherein each solar panel is mounted to a frame having a first member that extends outwardly from an outer edge of the solar panel and terminates in an outer edge member that is perpendicular in relation to the first member and extends downwardly from the first member.

15. The assembly of claim 14 wherein the outer edge member terminates in a second member that is perpendicular in relation to the outer edge member and extends inwardly to a position below and parallel to the first member.

16. The assembly of claim 15 wherein a lockdown plate having a hole is positioned on top of the second member and the hole is aligned with a slot in one of the plurality of rail members such that a bolt is received through the hole and the slot and secured with a nut and washer to provide a clamping force to the second member.

\* \* \* \* \*